(Model.)
J. L. RUNK.
SULKY PLOW.
No. 282,929. Patented Aug. 7, 1883.
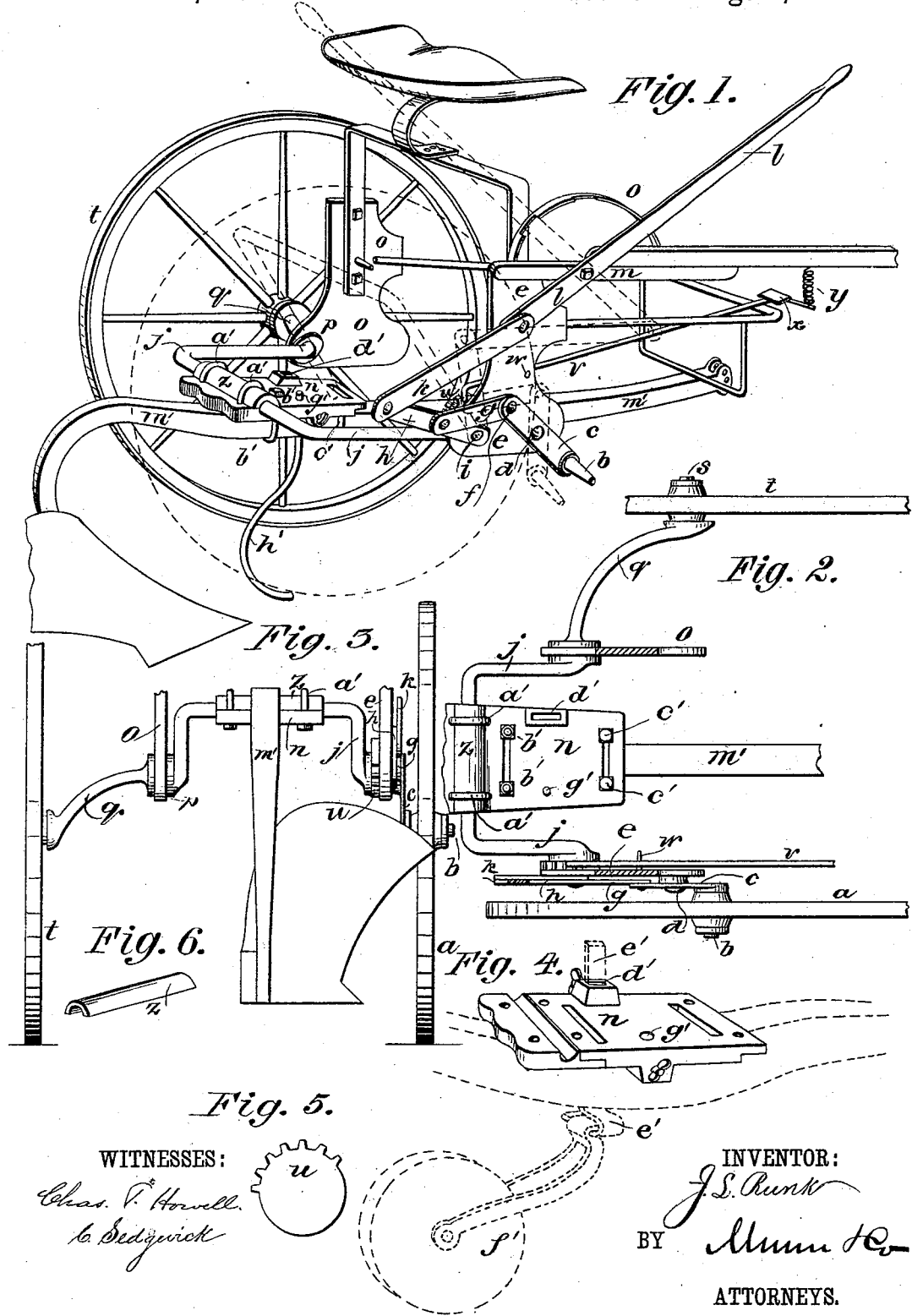
WITNESSES:
Chas. F. Howell.
C. Sedgwick.
INVENTOR:
J. L. Runk
BY Munn & Co.
ATTORNEYS.

UNITED STATES PATENT OFFICE.

JACOB L. RUNK, OF NASHVILLE, ILLINOIS, ASSIGNOR OF FOUR-FIFTHS TO AMOS WATTS, CHARLES ROSE, WILLIAM S. FORMAN, AND JAMES A. WATTS, ALL OF SAME PLACE.

SULKY-PLOW.

SPECIFICATION forming part of Letters Patent No. 282,929, dated August 7, 1883.

Application filed May 7, 1883. (Model.)

*To all whom it may concern:*

Be it known that I, JACOB L. RUNK, of Nashville, in the county of Washington and State of Illinois, have invented a new and Improved Sulky-Plow, of which the following is a full, clear, and exact description.

My invention consists, essentially, of a contrivance of the cranked axle and adjusting devices, whereby a single lever is enabled to shift the furrow-wheel up and the plow down, and the land-side wheel up when the plow is to be let down into the ground, and when said plow is to be raised out of the ground said lever will depress the furrow-wheel, and also the landside, and at the same time raise the plow, the plow being at all times maintained in a level condition transversely to the sulky; and my invention also consists of an improved contrivance of the plate by which the plow is connected to the crank-shaft to serve for a reversible colter-holder, whereby it may be shifted to hold the colter for a right-hand or a left-hand plow, as desired, all as hereinafter fully described.

Reference is to be had to the accompanying drawings, forming part of this specification, in which similar letters of reference indicate corresponding parts in all the figures.

Figure 1 is a perspective view of my improved sulky-plow with the furrow-wheel removed. Fig. 2 is a plan view with some of the parts broken off; Fig. 3, a rear elevation. Fig. 4 is a perspective view of the reversible colter-holder. Fig. 5 is a side elevation of the ratchet-wheel by which the plow is held in the different positions, and Fig. 6 is a perspective view of the cap for connecting the crank-shaft and plow-beam.

The furrow-wheel $a$ is mounted on an axle, $b$, that is attached to a bar, $c$, that is pivoted at $d$ to the frame-piece $e$, and said bar $c$ is jointed at $f$ to a link, $g$, that connects it to a lever, $h$, that is attached to the end of the journal $i$ of the crank-shaft $j$, where said journal projects through its bearing in the frame-piece $e$. This lever $h$ is connected by link $k$ with the hand-lever $l$, by which the attendant adjusts the machine, said lever being pivoted at $m$ to the frame of the machine, and provided with a notched holding-bar, $o$, into the notches of which said lever springs when let go by the attendant. The crank-shaft $j$ has the beam $m'$ of the plow clamped to it by the plate $n$, and has its other journal-bearing in the frame-piece $o$ at $p$. From this journal-bearing the crank-shaft has a curved arm, $q$, that carries the axle $s$ for the land-side wheel $t$. The crook of this arm and its range are in such relation to the vibrating bar $c$ that the furrow-wheel is attached to and also to the crank of the shaft $j$, to which the plow is attached, that when the crank-shaft is turned upward to lift the plow out of the ground and the furrow-wheel $a$ is shifted downward to cause the plow to be raised to the highest point the land-side wheel will be shifted down so that its axle is level with that of the furrow-wheel, both wheels being of the same size, and when the plow is lowered into the ground and the furrow-wheel adjusted to run in the furrow the land-side wheel will be shifted so that its axle is as much higher than the axle of the furrow-wheel as the depth of the furrow, thus always keeping the plow level. The crank-shaft is provided with a ratchet-wheel, $u$, with which a lever-pawl, $v$, engages, which is pivoted to the frame at $w$, and extends forward to a suitable point for the driver to disconnect it by pressing with his foot on the foot-piece $x$ when he wishes to shift the plow by the lever $l$. The spring $y$ engages said pawl with the ratchet when the driver relaxes the pressure on the foot-piece.

For connecting the plow-beam $m'$ to the crank-shaft, I use the plate $n$, having a groove and a cap, $z$, in which the crank is secured by the yoke-bolts $a'$, the plate being clamped to the beam by the yokes $b'$ and $c'$, and having a socket, $d'$, for receiving the stock $e'$ of a wheel-colter, $f'$, for holding the colter in its proper relation to the plow. Said plate also has a socket, $g'$, for the connection of the weed-turner $h'$. For enabling this plate to be reversed readily, so that it can support the colter-stock on either side of the beam for right or left hand plows, I propose to construct it in two parts, by which the grooved and capped part that connects with the crank-shaft may be detached from and bolted onto either end of the other or socket part of said plate, according to the way said part may be set.

In practice I may make the groove or socket for axle $j$ in plate $n$ oblong vertically at the end next the land side of the plow, and have set-screws bearing on the axle for raising or lowering the axle at the land-wheel side, to accommodate the wear of the lay of the plow and preserve the level of the plow.

Having thus described my invention, what I claim as new, and desire to secure by Letters Patent, is—

1. The land-side wheel connected to the crank-shaft by a curved arm, $q$, and the furrow-side wheel-axle pivoted to the frame and jointed to the cranked axle which carries the plow, whereby a single lever shifts the wheels and the plow, whether for regulating the depth of the plow or for wholly raising or lowering it out of or into the ground, without varying the level of the plow, substantially as described.

2. The furrow-wheel axle $b$, attached to bar $c$, pivoted to the frame, and connected to lever-arm $h$ of the crank-shaft, and the land-side wheel-axle connected to the crank-shaft $j$ by the crooked arm $q$, substantially as described.

3. The lever $l$, pivoted to the frame at $m$, and connected to lever-arm $h$ of the crank-shaft by the link $k$, in combination with vibrating bar $c$, having the furrow-wheel axle connected to it, and being pivoted to the frame at $d$, and connected by link $g$ with the said lever-arm $h$ of the crank-axle, substantially as described.

4. The clamping-plate $n$, for connecting the cranked axle to the plow-beam, having the socket $d'$ for the colter-stock $e'$, and also having the groove for the crank-axle, and being separable between said socket and groove, and the socket part being reversible, substantially as described.

JACOB L. RUNK.

Witnesses:
GEORGE W. AKINS,
W. T. JONES.